(12) United States Patent
Wernersson (10) Patent No.: US 9,451,136 B2
(45) Date of Patent: Sep. 20, 2016

(54) ARRAY CAMERA SHUTTER

(75) Inventor: Mats Wernersson, Helsingborg (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 5 days.

(21) Appl. No.: 14/237,922

(22) PCT Filed: Aug. 11, 2011

(86) PCT No.: PCT/EP2011/063836
§ 371 (c)(1),
(2), (4) Date: Feb. 20, 2014

(87) PCT Pub. No.: WO2013/020601
PCT Pub. Date: Feb. 14, 2013

(65) Prior Publication Data
US 2014/0198248 A1    Jul. 17, 2014

(51) Int. Cl.
*H04N 5/225* (2006.01)
*H04N 5/235* (2006.01)
*G03B 9/10* (2006.01)
*G03B 9/38* (2006.01)

(52) U.S. Cl.
CPC ............. *H04N 5/2254* (2013.01); *G03B 9/10* (2013.01); *G03B 9/38* (2013.01); *H04N 5/2353* (2013.01)

(58) Field of Classification Search
CPC ............ H04N 9/90; H04N 2209/048; H04N 3/1593; H04N 5/2254
USPC ............... 348/262, 218.1; 396/483, 485, 490
See application file for complete search history.

(56) References Cited

U.S. PATENT DOCUMENTS

| 3,852,787 | A | 12/1974 | Nims |
| 4,101,913 | A | 7/1978 | Gallistel |
| 5,136,319 | A | 8/1992 | Ushiro |
| 6,765,617 | B1 * | 7/2004 | Tangen et al. ................. 348/340 |
| 2007/0002159 | A1 * | 1/2007 | Olsen et al. .................. 348/335 |
| 2009/0304033 | A1 * | 12/2009 | Ogilvy ................ H01S 3/08059 372/10 |
| 2010/0111517 | A1 * | 5/2010 | Yasuda .......................... 396/532 |

OTHER PUBLICATIONS

International Search Report from corresponding International Application No. PCT/EP2011/063836, mailed Sep. 26, 2011.

* cited by examiner

*Primary Examiner* — Mark Monk
(74) *Attorney, Agent, or Firm* — Renner, Otto, Boisselle & Sklar LLP (57) ABSTRACT

The present invention relates to a shutter blade arrangement (134) for an array camera (100) comprising an array (130) of lenses (131). The shutter blade arrangement (134) comprises: at least one shutter blade (200), an array of openings (201) on said shutter blade (200), and an actuator (160) to control the at least one shutter blade (200), and wherein the at least one shutter blade (200) and said array of lenses (131) are displaceable relative each other.

14 Claims, 6 Drawing Sheets

ARRAY CAMERA SHUTTER

TECHNICAL FIELD

The present invention relates generally to array cameras and a method in array cameras. In particular, the invention relates to a shutter and adjustment of a shutter blade in an array camera.

BACKGROUND

An array camera is a type of a light-field camera. The array camera comprises an array of micro camera lenses enabling to capture 4D light field information about a scene. Such light field information can be used to improve the image of a scene by use of an image editing software in a computer.

This technology is now about to enter the consumer camera market. The potential of lowering the height of the camera compared with traditional technology is one of the advantages appreciated by the manufacturing industry of wireless devices, such as mobile terminals or mobile phones. Some other known features are high dynamic range imaging, post processing focusing and control of depth of field.

Traditional Complementary metal-oxide-semiconductor (CMOS) cameras have what is known as a rolling shutter. The individual pixels are not integrating the signal produced by light to electricity conversion simultaneously but rather in a "rolling" fashion starting at one corner of the sensor and progressing across rows horizontally iterating vertically line by line until the last pixel located in the opposite corner of the starting pixel is reached. Typically this iteration is performed in a first step as resetting the pixels and thereby starting the integration. In a second step the signal is read as the pixels are iterated whish thereby is the end of the integration.

The rolling shutter causes an effect known as motion distortion. The integration time, or exposure time, might be short enough to freeze the motion of a moving object providing a sharp image. But the object is depicted distorted as the object moves from the moment the first pixel is exposed until the last pixel is exposed.

Yet another problem with the rolling shutter is observed when a flash is used. All the pixels have to integrate light simultaneously during the short duration of the flash light. This requirement makes the usage of a short duration flash, e.g. a Xenon flash, difficult.

A so called global shutter allows all pixels to integrate light simultaneously which solves both of the above mentioned problems. Global shutter designs that are integrated in the semiconductor image sensor have been developed. There are however disadvantages and also problems to overcome with this design. A known problem is to integrate an electrical global shutter into a wireless device such as a mobile phone.

A mechanical global shutter has been used in some cameras to solve the problems in a satisfying way. The integration of light is typically started with the shutter open by resetting all pixels simultaneously. The integration is stopped by closing the shutter and thereby covering the lens opening. The sensor is then read in a rolling mode which is feasible as they are protected from light exposure.

A typical mechanical shutter design is placed on top of a mobile phone camera. The array camera is however typically much lower in height than a traditional camera. The height may be as low as 60% in a comparison. This leaves room for a mechanical shutter in the case of an array camera while still maintaining a reasonable low height.

SUMMARY

One object of the invention is to provide a mechanical shutter for small sized array cameras.

According to one aspect of the invention, a shutter blade arrangement for an array camera comprising an array of lenses is provided. The shutter blade arrangement comprises: at least one shutter blade, an array of openings on the shutter blade, an actuator to control the at least one shutter blade and wherein the at least one shutter blade and the array of lenses are displaceable relative each other. In one embodiment, the array of openings of the at least one shutter blade corresponds to the array of camera lenses. Preferably, the at least one shutter blade and the array of lenses are displaceable relative each other in one or several of vertical, horizontal or diagonal directions providing a compact size. According to one embodiment, at least one of the openings of the at least one shutter blade has a geometrical shape being one of circular, rectangular, rhomb, or triangular. At least one of the openings of the at least one shutter blade has a diameter smaller than the diameter of a camera lens of the camera lens array serving as an adjustable aperture, or diaphragm, provided that the optical design of the camera lens.

For smaller size, in one embodiment, the shutter blade arrangement may comprise at least two shutter blades, whereby the at least two shutter blades are displaceable relative each other and relative the array of camera lenses. The at least two shutter blades are displaceable relative each other in one or several of a vertical, horizontal or diagonal directions. In one embodiment at least one opening of the at least one shutter blade of the at least two shutter blades has a geometrical shape being one of circular, rectangular, rhomb, or triangular. At least one of the openings of the at least two shutter blades has a diameter smaller than the diameter of a camera lens of the camera array serving as an adjustable aperture, or diaphragm, provided that the optical design of the camera lens.

In one advantages embodiment, the shutter blade arrangement comprises at least one filter holder frame configured with at least one opening comprising a filter configured to cover at least one of the camera lenses of the array of camera lenses. At least one opening of the filter holder frame is configured with any one of a neutral gray, a colored, a polarized or an infrared blocking filter.

The invention also relates to a method in an array camera for adjusting an array camera setting. The method comprises the steps of: displacing at least one shutter blade comprising a number of openings corresponding to a number of camera lenses by actuating an actuator.

The invention also relates to an array camera comprising a shutter blade arrangement as mentioned above. Preferably, the array camera comprises lenses of a refractive power. The array camera may be used in a wireless device.

An advantage of the present invention, by using a shutter blade with an array of openings, will provide a shutter for an array camera that uses minimum space.

Another advantage of the present invention is that the same mechanism is used to enable a filter switch.

BRIEF DESCRIPTION OF THE DRAWINGS

The various aspects of embodiments of the present solution, including its particular features and advantages, will be readily understood from the following detailed description and the accompanying drawings, in which.

DETAILED DESCRIPTION

Figures 1A, 1B, 1C:
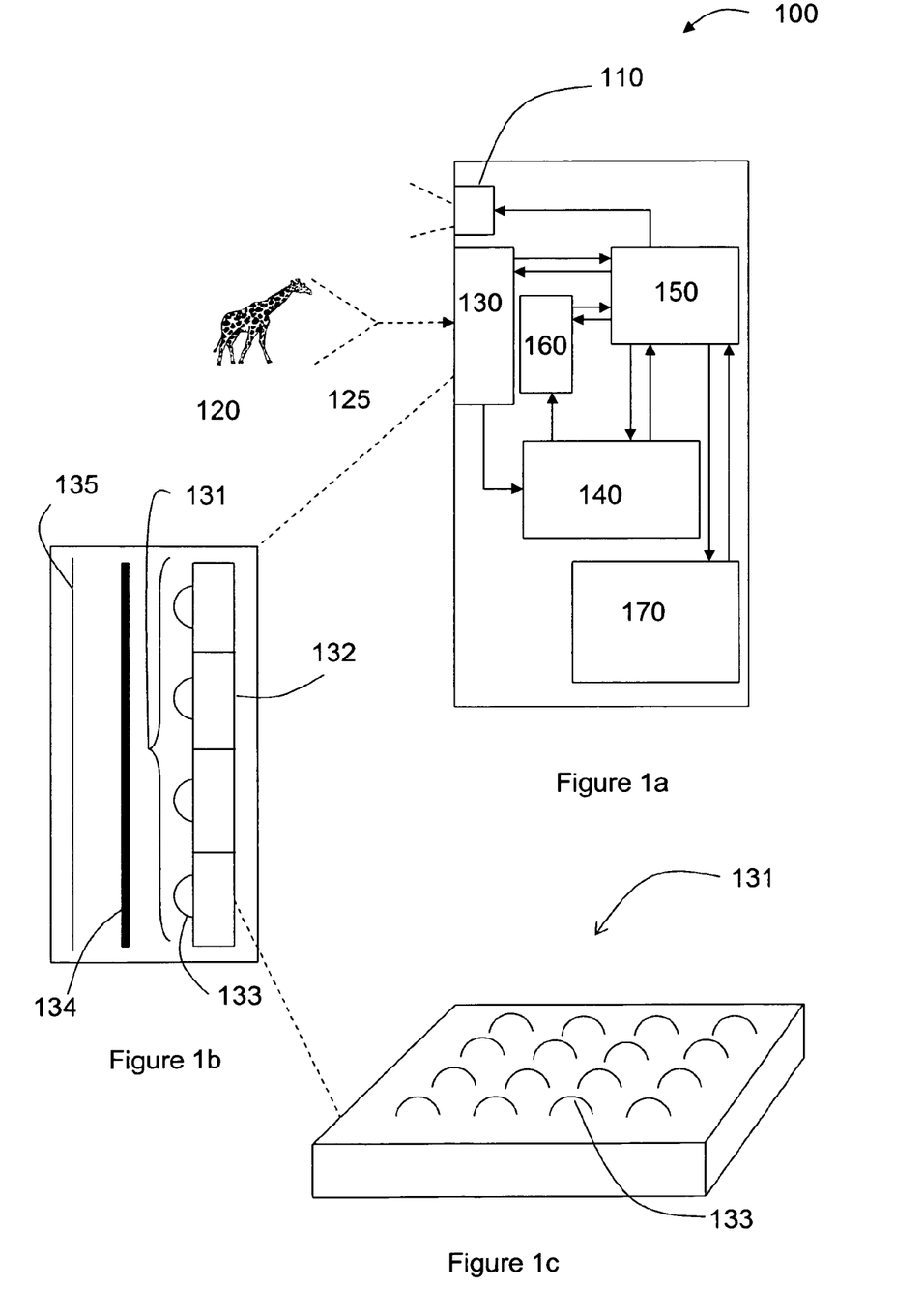
FIG. 1a is a schematic block diagram illustrating an array camera.
FIG. 1b is a schematic illustration of an image capturing unit in the camera of FIG. 1a in more detail.
FIG. 1c is a schematic illustration of array of camera lenses in the camera of FIG. 1a in more detail.

FIG. 1a depicts an array camera 100, which may be a part of a wireless device such as e.g. a mobile terminal. The array camera 100 comprises an image capturing unit 130 configured to capture an image of an object 120 in the form of image data. The array camera 100 further comprises an image processing unit 140 configured to process image data and a camera setting unit or actuator unit 160 adapted to determine a camera setting based on the image data. Further the array camera 100 may have settings represented by the setting of exposure time, aperture, image sensor gain, white balance and/or the emitting light of a source of light 110. The array camera 100 may further comprise a memory 170 being adapted to store camera settings and other data.

The array camera 100 further comprises, as mentioned above, the source of light 110. The source of light 110 is adapted to emit a (pulsed) flash or to emit continuous light. As an alternative embodiment, the array camera 100 may further comprise a second source of light (not shown). In this alternative case, the source of light 110 is adapted to emit the flash and the second source of light is adapted to emit continuous light. However, in the following description the invention is described and discussed based on the embodiment with one source of light 110. The source of light 110 and second source of light where appropriate, may be represented by a Light Emitting Diode (LED), or any other suitable source of light such as an electric light bulb.

The present camera setting mechanism can be implemented through one or more processors, such as a processor 150, depicted in FIG. 1a, together with a computer program code for performing the functions of the invention. The program code mentioned above may also be provided as a computer program product, for instance in the form of a data carrier carrying computer program code for performing the present method when being loaded into the camera 100. One such carrier may be in the form of a memory stick, a storage disc, etc. The computer program code can furthermore be provided as pure program code on a server and downloaded to the array camera 100 remotely.

The image capturing unit 130, as depicted by FIG. 1b, comprises an array of camera lenses 131, being at least defined by two individual lenses 133. When exemplifying embodiments herein, the array of 16 individual lenses 131 will be used, as depicted by FIG. 1c, but it should not be seen as a limitation with respect to the amount of individual camera lenses 133. The array of camera lenses 131 is configured to receive light 125 from the object 120. The image capturing unit 130 further comprises an array of photo sensing means 132 that receives the light 125 of the object 120 transmitted from the array of camera lenses 131. The image capturing unit 130 further comprise a shutter blade arrangement 134 with at least one shutter blade 200 as depicted by an exemplified shutter blade 200 in FIG. 2a. The actuator unit 160 controls the shutter blade 200 by enabling the shutter blade 200 to be displaceable relative to the array of camera lenses 131.

Furthermore, the embodiment, as depicted by FIG. 1b, may comprise a glass or plastic cover 135, which protects the shutter blade arrangement and the array of camera lenses 131 but allows the receiving light to enter.

Figure 2A:
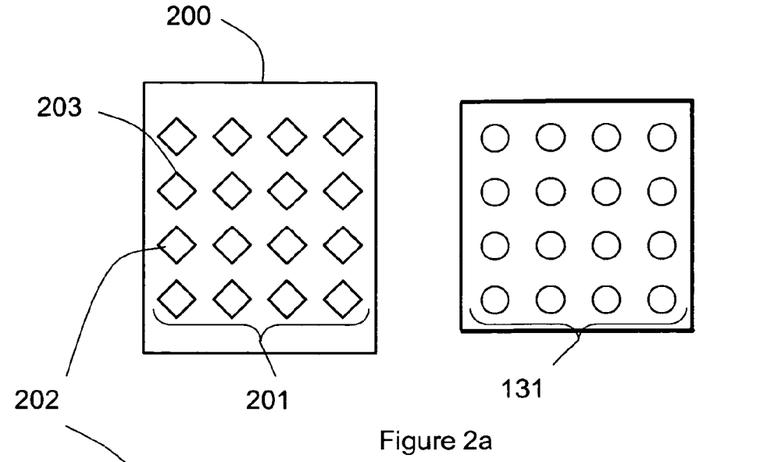
FIG. 2a depicts, at left side, an exemplary schematic shutter blade according to the invention and at right side a top view of an array of camera lenses.

The shutter blade 200, as depicted by the left drawing in FIG. 2a, comprises an array of openings 201 in this case shaped as rhomb 203. This array of openings 201 may correspond to the array of camera lenses 131 as depicted by the right drawing.

The individual camera lenses 133 in the array of camera lenses 131 that forms a part of the array camera 100 are typically small compared to a conventional camera. Thus, the individual lens 133 openings are much smaller than for a large single lens camera. By making a shutter with shutter blade 200 having an array of individual openings or apertures 202 for each camera lens allows the shutter to achieve a compact an efficient design.

The terms "opening" or "aperture" as used herein imply to portions allowing visible or invisible light to pass through.

Figure 2B:
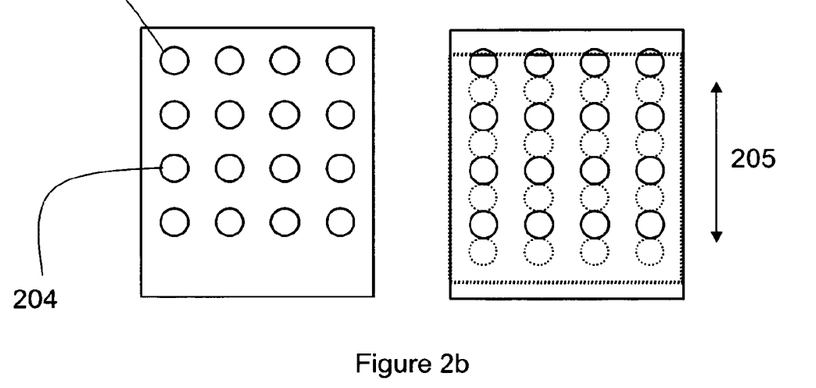
FIG. 2b depicts, at left side, an exemplary shutter blade according to the invention on top of an array of camera lenses and at right side the shutter blade displaced vertically.

According to one embodiment, the shutter blade 200 is displaceable in a vertical direction 205 as depicted in FIG. 2b. Further in FIG. 2b, the left drawing illustrates an exemplified shutter blade having an array of circular openings 204 which are placed on top of an array of camera lenses 131; in this case not covering the camera lenses. The right drawing depicts the same arrangement as the left drawing but the shutter blade is displaced vertically 205, thereby covering all lenses 131 and blocking it from receiving the light 125.

According to some embodiments, the shutter blade 200 may be displaceable in alternative directions, such as horizontal direction or diagonal direction.

An alternative to the directional displacement of the shutter blade 200, at least one of the openings 202 of the array of openings 201 of the shutter blade 200 having circular or rhomb shaped openings would be to have other designs such as rectangular, triangular, elliptical etc. or combinations thereof.

The alternative openings in combination with the directional displacement may provide for additional possibilities in relation to how the light may be received by the array of camera lenses.

According to some embodiments, the shutter blade arrangement 134 may comprise at least two shutter blades

200a and 200b. The two shutter blades 200a and 200b may be displaceable relative each other and relative the array of camera lenses 131.

Figure 2C:
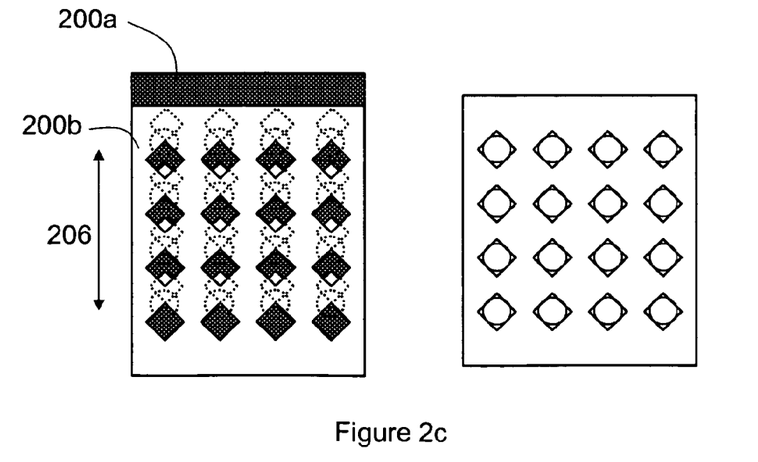
FIG. 2c depicts, at right side, two schematic shutter blades, according to the invention, on top of an array of camera lenses and at left side the shutter blades displaced vertically.

FIG. 2c depicts how the two shutter blades 200a and 200b may be placed on top of each other over the array camera lenses 131 and displaced in vertical direction 206 relative each other and the array of camera lenses 131 to a position where the camera lens openings are fully covered (left side drawing) or closed (right side drawing).

Figure 3:
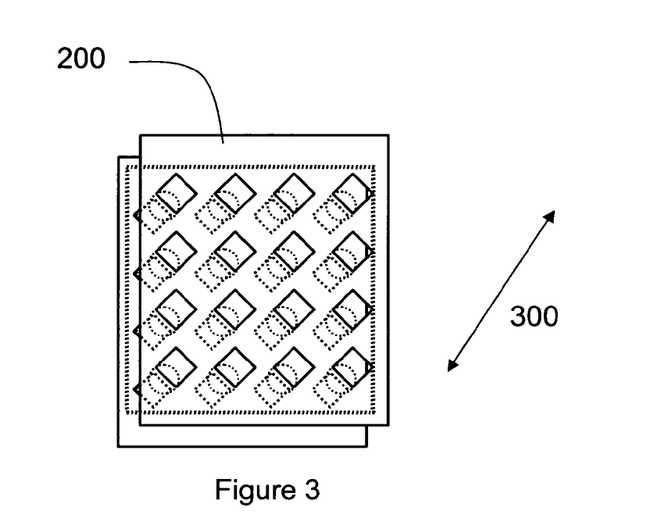
FIG. 3 depicts two shutter blades of FIG. 2c, displaced diagonally.

Furthermore, the two shutter blades 200a and 200b may be displaceable relative each other and the array of camera lenses 131 in horizontal direction (not shown). Furthermore, FIG. 3 depicts an alternative design where the two shutter blades 200a and 200b may be displaceable relative each other and the array of camera lenses 131 in diagonal direction 300.

It should be noted that the displacement in the different directions may be done fully or partly, depending on the camera settings and configurations.

According to one embodiment, at least one opening 202 of at least one shutter blade 200a/200b of the two shutter blades may be circular, rectangular, rhomb shaped etc. Furthermore, at least one of the openings 202 of the two shutter blades 200a/200b may have a diameter smaller than the diameter of a camera lens 133.

It should be noted that a conventional camera having one lens opening usually requires a shutter where the shutter blades are displaceable several millimeters typically be 2 to 3 millimeters. While in the array camera 100 which have smaller lens openings, the shutter blade(s) 200 may be displaceable less than one millimeter. Thereby the design of the actuator unit 160 may be more compact and power efficient.

The actuator unit 160 may be one of several technologies such as electro mechanical, piezo crystal, shape memory alloy or Micro-Electro-Mechanical Systems (MEMS).

Figure 4A:
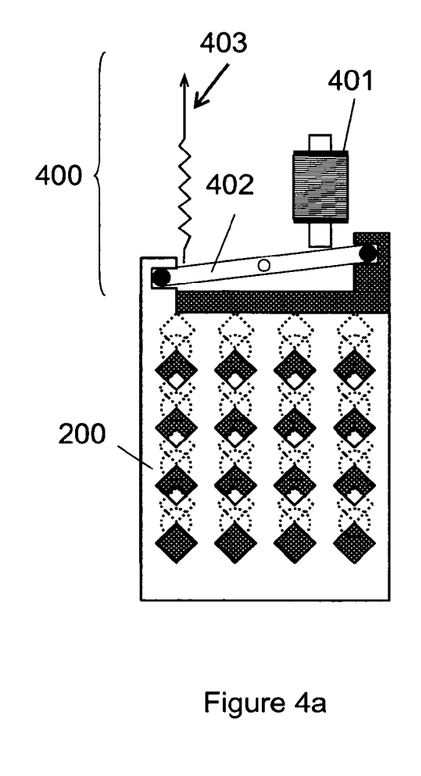
FIGS. 4a and 4b depict an example of a shutter blade arrangement, according to the invention, having an electromagnetic actuator.
Figure 4B:
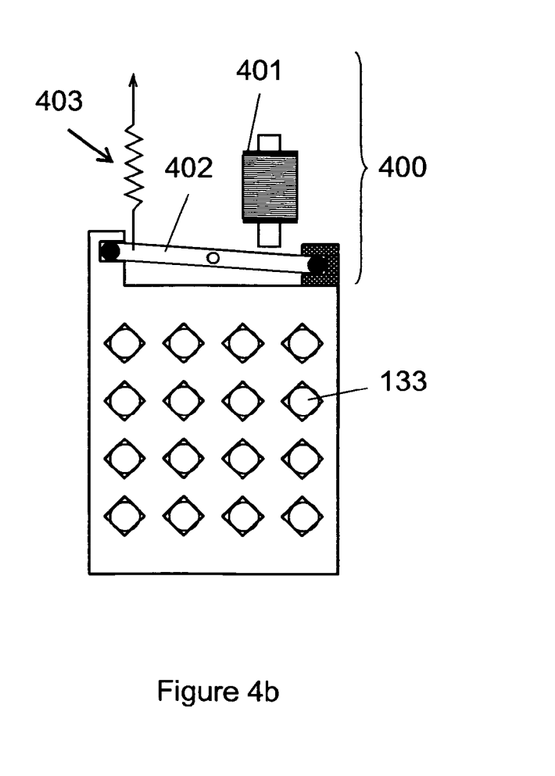

FIGS. 4a and 4b depict schematically a design of the shutter having an electromagnetic actuator 400, comprising an electromagnetic part 401, a hinged arm 402 and a spring 403. The hinged arm 403 is arranged as a lever hinged in the centre position and connected to the shutter blade(s) 200 at its ends. In operation, the electromagnetic part 401 is energized and generates a magnetic field, which attracts the hinged arm connected to the shutter. The shutter is displaced vertically blocking the lenses 133 (FIG. 4a). When the electromagnetic portion is di-energized, the spring 403 displaces the arm 402 and the lenses 133 are uncovered (FIG. 4b). This is just to illustrate the principle of attaching an actuator unit 160 to the shutter design. Various mechanical solutions may be considered for such a mechanism.

Figure 6:
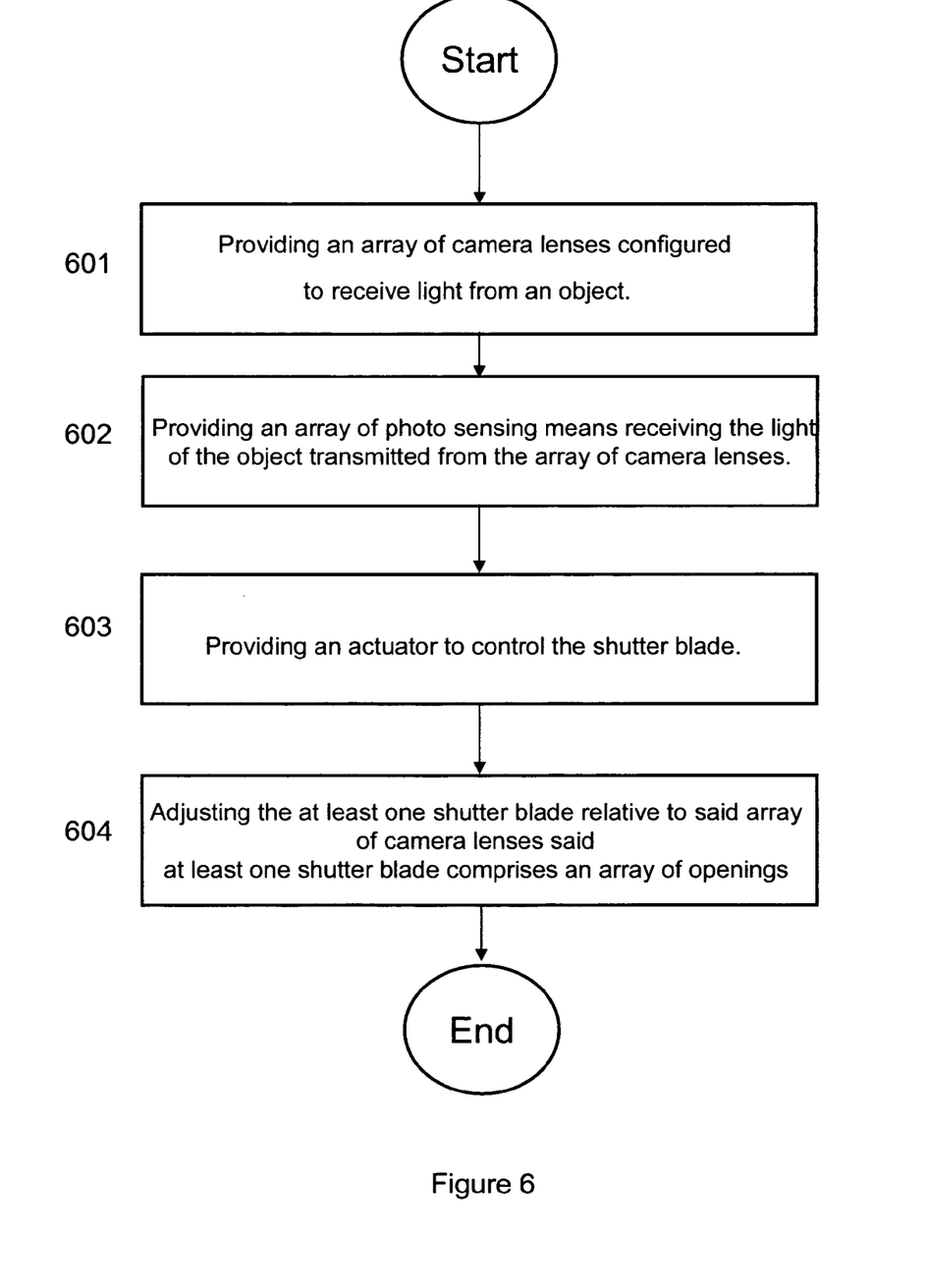
FIG. 6 is a flowchart illustrating a method, according to the invention, in the array camera.
Figure 7:
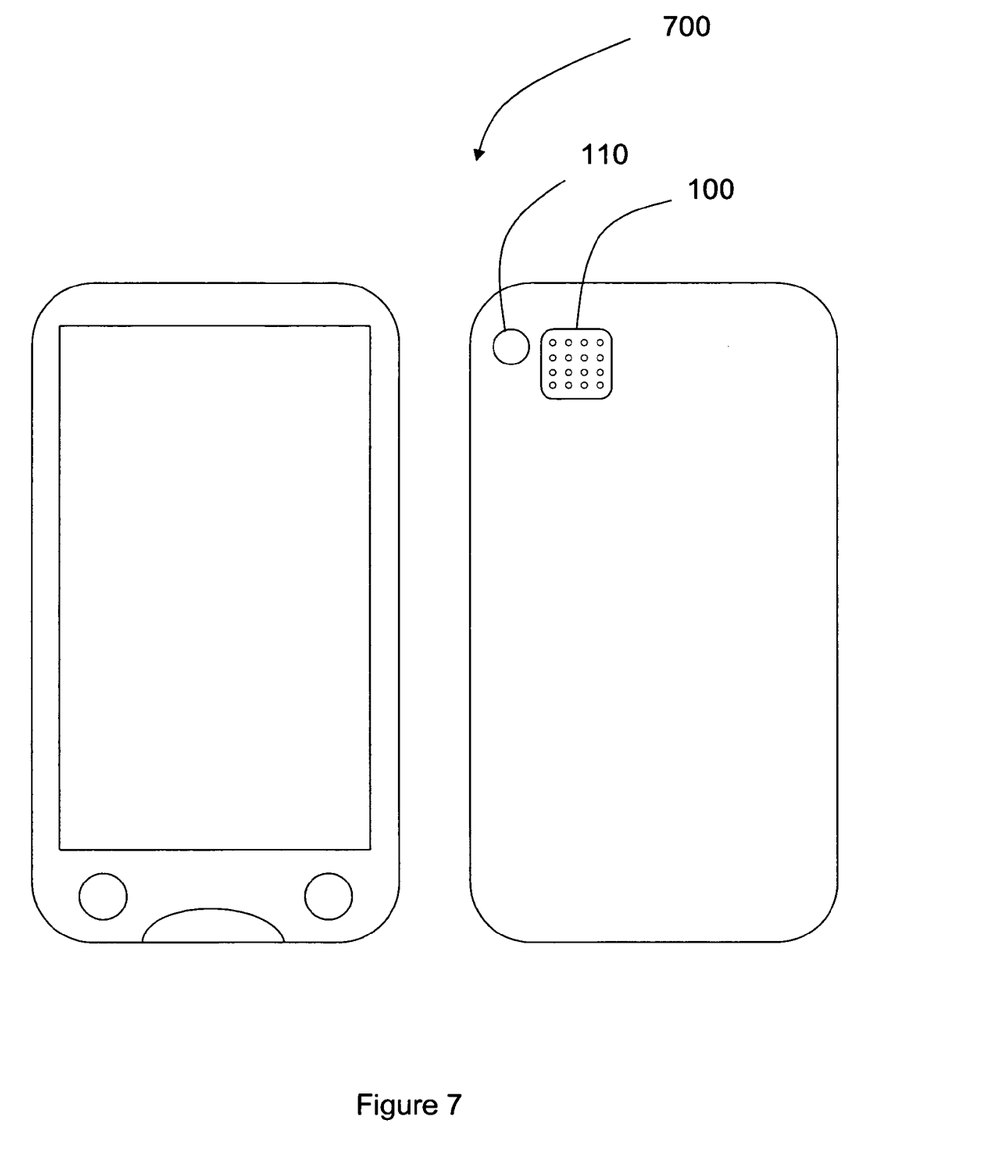
FIG. 7 shows a wireless device comprising an array camera, according to the invention.

The present method in an array camera 100 for adjusting a camera setting when using a shutter blade arrangement 134 according to the present invention will now be described with reference to a flow chart depicted in FIG. 6. The array camera 100 may be comprised in a wireless device 700 or in a mobile terminal. The method comprises the steps of:

601. An array of camera lenses 131 is provided to be configured to receive light 125 from an object 120. The light 125 will be received in a different angel for each camera lens in the array of camera lenses 131. This may enable a 3D depth of the image.

602. An array of photo sensing means 132 receives the light 125 of the object 120 transmitted from the array of camera lenses 131.

603. In this step, an actuator unit 160 provided to control the shutter blade 200 by use of a processor 150. The processor 150 processes the received data from the photo sensing means, thereby the processor 150 generates a signal. The signal is transmitted to the actuator unit 160 in order to activate said actuator unit 160.

604. The shutter blade 200 is adjusted relative to the array of camera lenses 131 based on the signal from the actuator unit 160. The shutter blade comprises an array of openings 201 which openings are of any suitable design.

According to another embodiment the shutter blade arrangement may act as a filter switch as depicted in FIGS. 5a-5d.

The shutter blade arrangement 134 may comprise at least one filter holder frame 500 configured to at least one opening 501 comprising a filter configured to cover at least one of the camera lenses of the array of camera lenses 131.

Figures 5A, 5B, 5C:
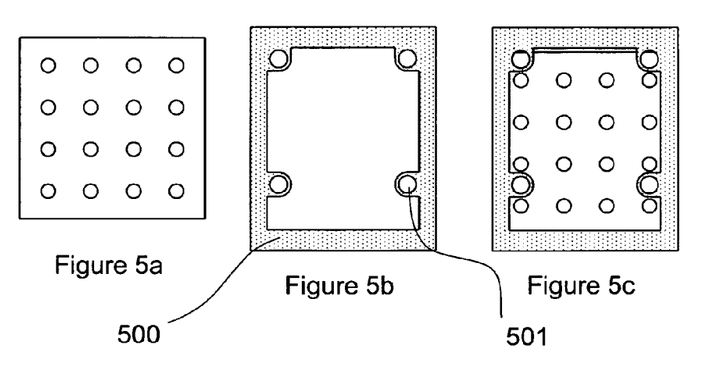
FIGS. 5a-5d depict a vertical displacement of an exemplified filter frame, according to the invention, covering four array camera lenses.
Figure 5D:
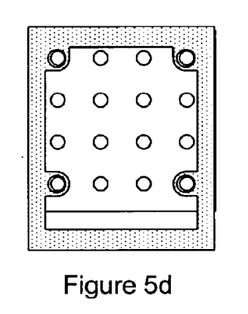

FIGS. 5a-5d depicts an exemplified design where the lens openings 501 of four camera lenses can be covered with filters. The example is based on an array camera having 16 lens openings (FIG. 5a) and a filter holder frame 500 having four filters, FIG. 5b. In FIG. 5c, the filter frame is illustrated aligned on top of the array of camera lenses in a position where none of the camera lenses are covered with a filter. In FIG. 5d, the filter frame is in a position where the camera lenses in the four corners of the array of camera lenses are covered by a filter. Thereby none of the other camera lenses of the array of camera lenses are covered.

According to some embodiments the shutter blade arrangement 134 may have at least one opening 501 of the filter holder frame 500 configured with any one of a neutral gray, a colored, a polarized or a infrared blocking filter.

Neutral grey filter may, for example, enable imaging with a higher dynamic range while maintaining the same integration time for all images.

Infrared blocking filters are usually a part of the optical design of a digital camera. The filters are normally fixed.

When having this mechanism the filters may be removed from four of the array of camera lenses. This makes the four camera lenses sensitive for near infrared radiation, typically in the range of 650-1000 nm wavelength. This extension of the sensitivity allows for so called night vision. An additional light source such as a IRED (Infra Red Emitting Diode) may be used as an illumination source.

The particular arrangement of the filter can be varied and is not limited to the four corner cameras.

According to some embodiments the same arrangement may also be used to hold optical elements having a refractive power such as positive lenses. This would extend the focusing range of the device. In particular it would allow for extreme close up photos.

In some embodiments, it is also possible to displace the lens array and sensing elements relative the shutter blade(s) or displace both the lens array and sensing elements and the shutter blade(s) relative each other.

According to some embodiments, yet another alternative may be to just have clear openings having a smaller diameter than the lens opening of the camera lenses. It then serves as an adjustable aperture, or diaphragm, provided that the optical design of the camera lens is such that the entrance pupil is located near the plane of the frame openings.

The array camera 100 may be part of a wireless device 700 as depicted in FIG. 7. This is a proposed implementation and the array camera 100 may be implemented in other ways.

However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Well-known functions or constructions may not be described in detail for brevity and/or clarity.

The present invention may be embodied as methods, electronic devices, and/or computer program products. Accordingly, the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Embodiments according to the present invention are described with reference to block diagrams and/or operational illustrations of methods and wireless devices 700. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analogue and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. It will be further appreciated that the functionality of any or all of the program modules may also be implemented using discrete hardware components, one or more application specific integrated circuits (ASICs), or a programmed digital signal processor or microcontroller. In drawings and specification, there have been disclosed exemplary embodiments of the invention. However, many variations and modifications can be made to these embodiments without substantially departing from the principles of the present solution. Accordingly, although specific terms are employed, they are used in a generic and descriptive sense only and not for the purposes of limitation, the scope of the invention being defined by the following claims.

The invention claimed is:

1. A shutter blade arrangement for use in an array camera having an array of lenses, the shutter blade arrangement comprises:
   at least two shutter blades,
   an array of openings on said shutter blades, and
   an actuator to control the at least two shutter blades,
   wherein the at least two shutter blades are displaceable relative each other and relative said array of camera lenses,
   wherein each of the openings of one pair of overlapping openings of the at least two shutter blades have a geometrical shape being rectangular, rhomb, or triangular, and
   wherein the shutter blade arrangement comprises at least one filter holder frame configured with at least one opening comprising a filter configured to cover at least one of the camera lenses of the array of camera lenses.

2. The shutter blade arrangement according to claim 1, wherein the array of openings of the at least two shutter blades corresponds to the array of camera lenses.

3. The shutter blade arrangement according to claim 1, wherein the at least two shutter blades and said array of lenses are displaceable relative each other in one or several of vertical, horizontal or diagonal directions.

4. The shutter blade arrangement according to claim 1, wherein at least one of the openings of at least two shutter blades has a diameter smaller than the diameter of a camera lens of the camera lens array.

5. The shutter blade arrangement according to claim 1, wherein the at least two shutter blades are displaceable relative each other in one or several of a vertical, horizontal or diagonal directions.

6. The shutter blade arrangement according to claim 1, wherein at least one of the openings of the at least two shutter blades has a diameter smaller than the diameter of a camera lens of the camera array.

7. The shutter blade arrangement according to claim 1, wherein at least one opening of the filter holder frame is configured with any one of a neutral gray, a colored, a polarized or a infrared blocking filter.

8. An array camera comprising:
a shutter blade arrangement comprising at least one shutter blade having an array of openings,
an array of lenses,
an array of photo sensing means configured to generate data signals corresponding to received image signals,
an infrared blocking filter statically arranged in front of a sub-portion of the lenses in the array of lenses,
an actuator unit to control the shutter blade arrangement,
wherein the shutter blade arrangement further comprises at least one filter holder frame configured with at least one opening comprising an infrared blocking filter configured to cover at least one of the lenses in said array of lenses not being part of the sub-portion of lenses, and
wherein the at least one shutter blade, the at least one filter holder frame and said array of lenses are displaceable relative each other by means of the actuator unit.

9. An array camera according to claim 8, wherein the array of camera lenses comprises lenses of a refractive power.

10. An array camera comprising:
a shutter blade arrangement comprising at least two shutter blades,
an array of lenses,
an array of photo sensing means configured to generate data signals corresponding to received image signals,
an array of openings on said shutter blades,
an actuator unit to control the at least two shutter blades,
wherein the at least two shutter blades are displaceable relative each other and relative said array of lenses,
wherein each of the openings of one pair of overlapping openings of the at least two shutter blades have a geometrical shape being rectangular, rhomb, or triangular, and
wherein the shutter blade arrangement comprises at least one filter holder frame configured with at least one opening comprising a filter configured to cover at least one of the camera lenses of the array of camera lenses.

11. The array camera of claim 8, wherein the array camera is part of a wireless device.

12. The array camera of claim 10, wherein the array camera is part of a wireless device.

13. A shutter blade arrangement for use in an array camera having an array of lenses, the shutter blade arrangement comprises:
at least two shutter blades,
an array of openings on said shutter blades, and
an actuator to control the at least two shutter blades,
wherein the at least two shutter blades are displaceable relative each other and relative said array of camera lenses,
wherein the shutter blade arrangement comprises at least one filter holder frame
configured with at least one opening comprising a filter configured to cover at least one of the camera lenses of the array of camera lenses,
wherein each of the openings of one pair of overlapping openings of the at least two shutter blades have a geometrical shape being rectangular, rhomb, or triangular.

14. The shutter blade arrangement according to claim 13, wherein at least one opening of the filter holder frame is configured with any one of a neutral gray, a colored, a polarized or a infrared blocking filter.

* * * * *